US012181104B2

(12) United States Patent
Aguiar et al.

(10) Patent No.: US 12,181,104 B2
(45) **Date of Patent: *Dec. 31, 2024**

(54) HANDLE FOR A PORTABLE CYLINDER

(71) Applicant: AMTROL LICENSING INC., West Warwick, RI (US)

(72) Inventors: Carlos Aguiar, Oporto (PT); Filipe Pedrosa, Matosinhos (PT)

(73) Assignee: AMTROL LICENSING INC., West Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,345

(22) Filed: Jan. 17, 2023

(65) Prior Publication Data

US 2023/0151932 A1 May 18, 2023

Related U.S. Application Data

(63) Continuation of application No. 16/986,353, filed on Aug. 6, 2020, now Pat. No. 11,585,491.

(51) Int. Cl.
*F17C 13/08* (2006.01)
*F17C 13/04* (2006.01)

(52) U.S. Cl.
CPC ............ *F17C 13/084* (2013.01); *F17C 13/04* (2013.01); *F17C 2201/0109* (2013.01);
(Continued)

(58) Field of Classification Search
CPC .................... F17C 13/084; F17C 13/04; F17C 2201/0109; F17C 2201/058;
(Continued)

(56) References Cited

U.S. PATENT DOCUMENTS 4,880,134 A * 11/1989 Wood, Jr. ................ F17C 13/06 137/382
9,932,148 B2 4/2018 Chohfi
(Continued)

FOREIGN PATENT DOCUMENTS

EP 3434963 A1 * 1/2019 ............. F17C 13/04
WO 9711309 A1 3/1997
WO 2020071894 A1 4/2020

OTHER PUBLICATIONS

English Machine Translation of EP-3434963-A1 (Year: 2019).*
(Continued)

*Primary Examiner* — Nathan J Jenness
*Assistant Examiner* — Laura E. Parker
(74) *Attorney, Agent, or Firm* — TUCKER ELLIS LLP

(57) ABSTRACT

Provided is a portable cylinder including a tank having an upper portion having a valve port, a mounting collar coupled to the upper portion of the tank, and a handle attached to the mounting collar. The mounting collar has an upwardly extending portion surrounding the valve port and a plurality of circumferentially spaced tabs extending radially outwardly from the upwardly extending portion, wherein a respective gap is formed between adjacent ones of the plurality of circumferentially spaced tabs. The handle includes a shroud portion including a plurality of circumferentially spaced ledges for abutting an underside of a respective one of the plurality of circumferentially spaced tabs, and at least one tab for engaging the mounting collar in one of the gaps, and a handle portion extending from the shroud portion and having one or more areas for grasping the handle.

20 Claims, 18 Drawing Sheets

(52) U.S. Cl.
CPC .................. *F17C 2201/058* (2013.01); *F17C 2205/0165* (2013.01); *F17C 2205/0308* (2013.01); *F17C 2205/0323* (2013.01)

(58) Field of Classification Search
CPC ...... F17C 2205/0165; F17C 2205/0308; F17C 2205/0323; F17C 2209/00; F17C 2270/07; Y10T 137/7062
USPC .... 220/581, 694.1, 696, 710.5; 16/422, 423, 16/424, 425
See application file for complete search history.

(56) References Cited

U.S. PATENT DOCUMENTS

| | | | | |
|---|---|---|---|---|
| 11,585,491 | B2 * | 2/2023 | Aguiar | F17C 13/04 |
| 2007/0034631 | A1 | 2/2007 | Minowa et al. | |
| 2010/0147859 | A1 * | 6/2010 | Chohfi | F17C 13/123 16/110.1 |
| 2012/0305577 | A1 * | 12/2012 | Dunn | A47G 19/2272 220/660 |
| 2016/0215928 | A1 * | 7/2016 | Chohfi | B65D 25/28 |
| 2019/0353305 | A1 * | 11/2019 | Aguiar | B65D 25/282 |

OTHER PUBLICATIONS

International Search Report and the Written Opinion of the International Searching Authority; PCT/US2021/044438; Jan. 12, 2022; 14 pgs.

* cited by examiner

HANDLE FOR A PORTABLE CYLINDER

RELATED APPLICATIONS

This application claims is a continuation of U.S. patent application Ser. No. 16/986,353 filed Aug. 6, 2020, which is hereby incorporated herein by reference.

TECHNICAL FIELD

In general, the present invention relates to a portable cylinder, and in particular to a handle for a portable cylinder.

BACKGROUND OF THE INVENTION

A variety of pressurized gas cylinders have been used for storage and transportation of pressurized gas products for household and industrial. For example, the cylinders may be used for the storage of gas for cooking appliances such as stoves or grills, for the storage of refrigerant, for the storage of helium, etc. Many of these cylinders have traditionally been fabricated of steel with a steel cylindrical body having a valve at the top for controlling the flow of gas from the cylinder, a footing at the bottom to provide stability for the cylinder upon a supporting surface, and a handle at the top to assist in transporting the cylinder and for protecting the valve.

SUMMARY OF THE INVENTION

In accordance with an embodiment of the present invention, a handle for a cylinder is provided. The handle includes a shroud portion configured to attach to a collar of the cylinder, the shroud portion including a plurality of circumferentially spaced ledges for abutting an underside of a respective one of a plurality of circumferentially spaced tabs of the collar, and at least one tab for engaging the collar, and a handle portion extending from the shroud portion and having one or more areas for grasping the handle.

In accordance with another embodiment of the present invention, a portable cylinder is provided. The portable cylinder includes a tank having an upper portion having a valve port, a mounting collar coupled to the upper portion of the tank, the mounting collar having an upwardly extending portion surrounding the valve port and a plurality of circumferentially spaced tabs extending radially outwardly from the upwardly extending portion, wherein a respective gap is formed between adjacent ones of the plurality of circumferentially spaced tabs, and a handle attached to the mounting collar. The handle includes a shroud portion including a plurality of circumferentially spaced ledges for abutting an underside of a respective one of the plurality of circumferentially spaced tabs, and at least one tab for engaging the mounting collar in one of the gaps, and a handle portion extending from the shroud portion and having one or more areas for grasping the handle.

In accordance with another embodiment of the present invention, a method of assembling a portable cylinder is provided, the cylinder including a tank having an upper portion, a collar attached to the tank at the upper portion, and a handle. The method includes lowering the handle onto the collar to cause a plurality of circumferentially spaced ledges of the handle to be received in gaps between adjacent ones of a plurality of circumferentially spaced tabs on the collar and to cause a deflectable tab of the handle to contact one of the plurality of circumferentially spaced tabs and to deflect, and rotating the handle until each of the plurality of circumferentially spaced ledges are positioned below a respective one of the plurality of circumferentially spaced tabs and the deflectable tab engages the collar in one of the gaps.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
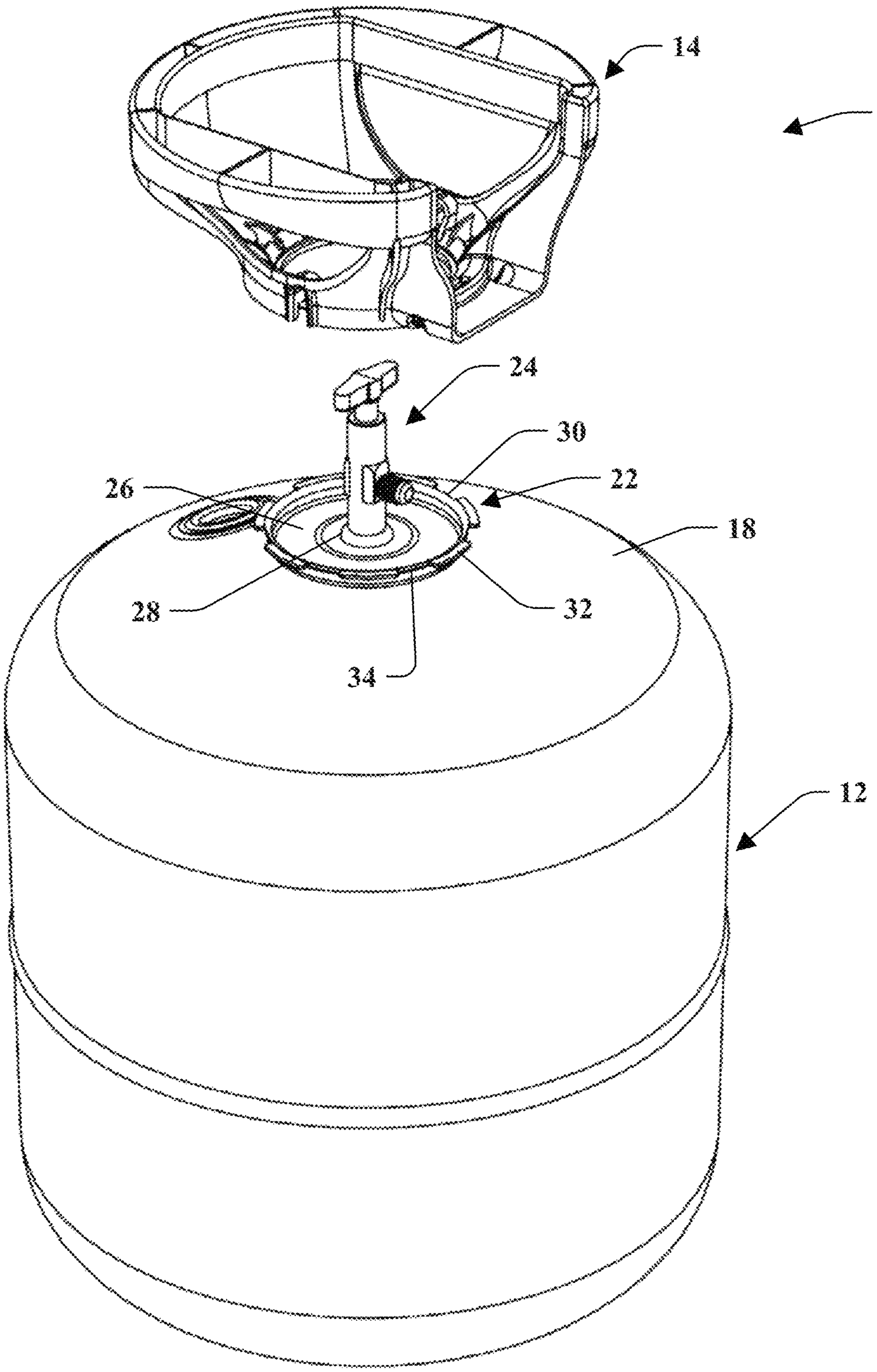
FIG. 1 is a front perspective view of an exemplary cylinder.
Figure 2:
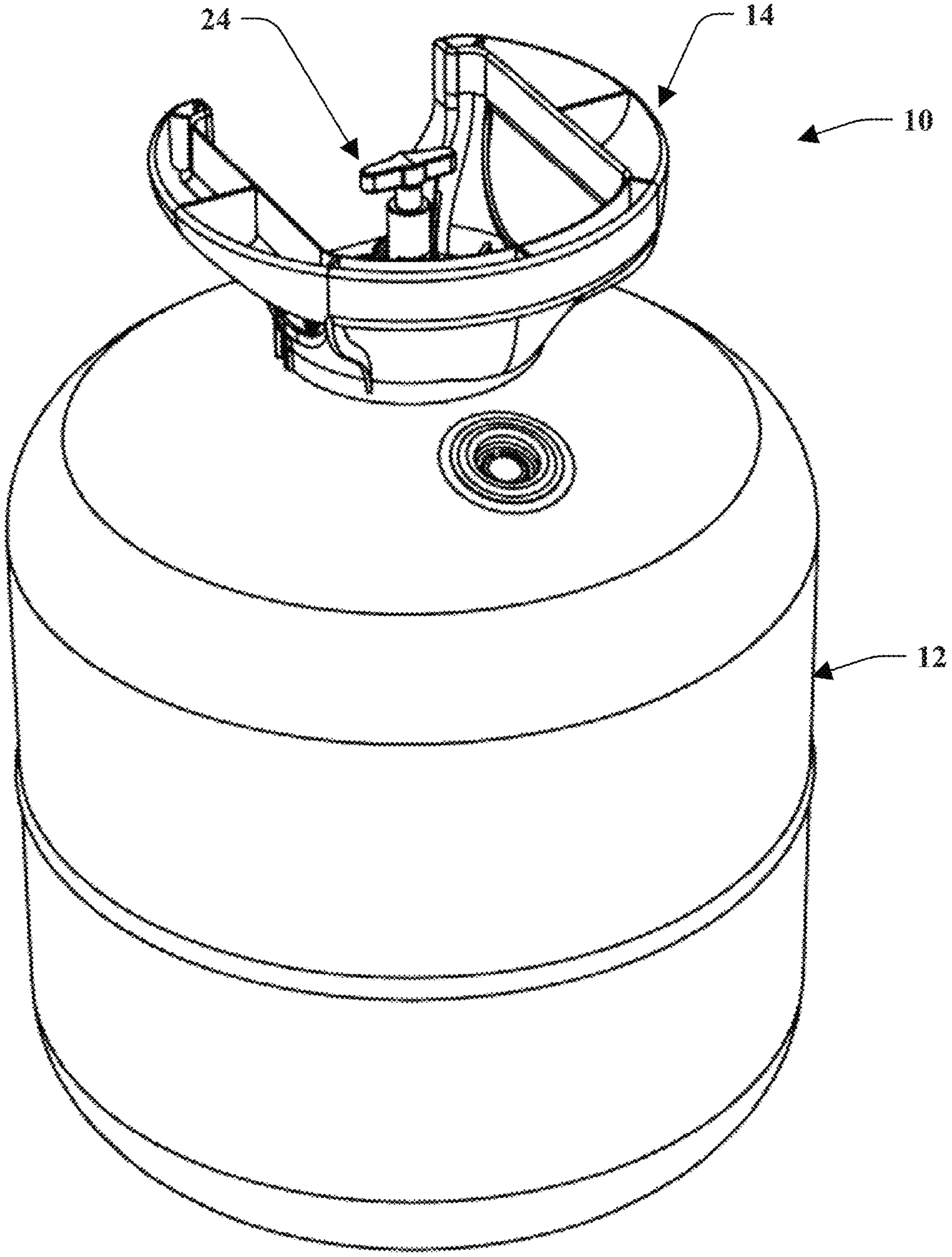
FIG. 2 is a rear perspective view of the cylinder.
Figure 3:
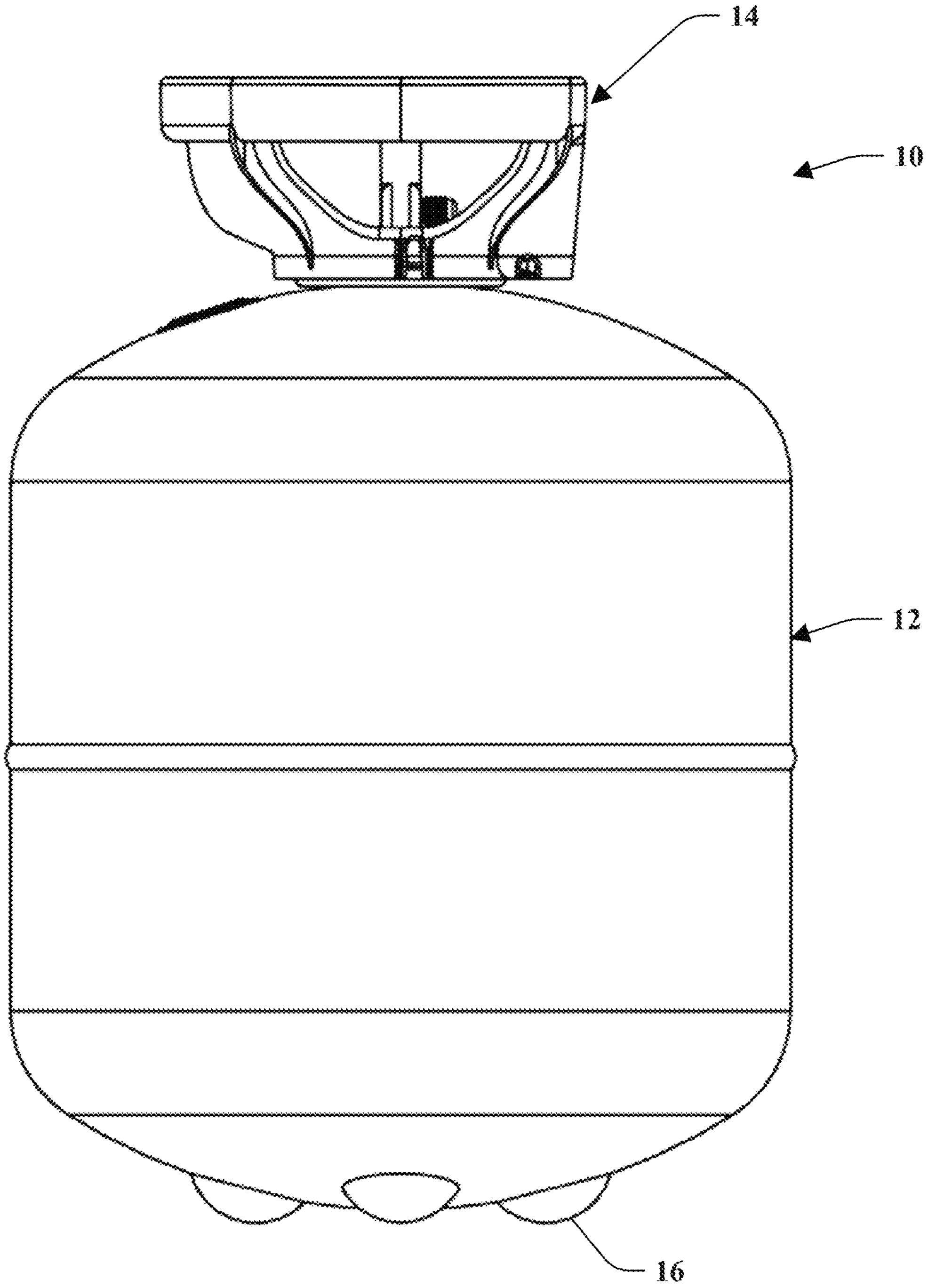
FIG. 3 is a left side view of the cylinder.
Figure 4:
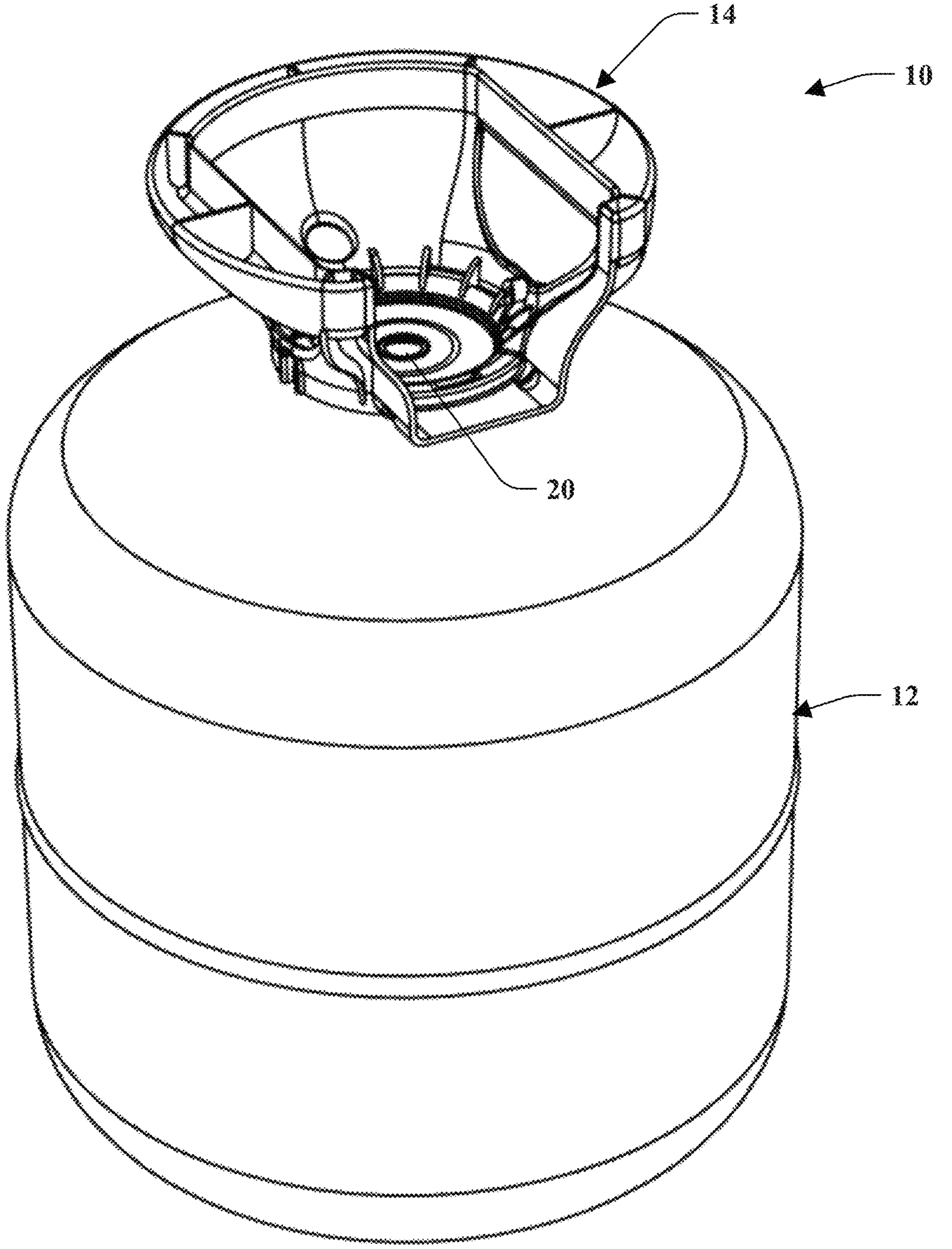
FIG. 4 is another front perspective view of the cylinder.
Figure 5:
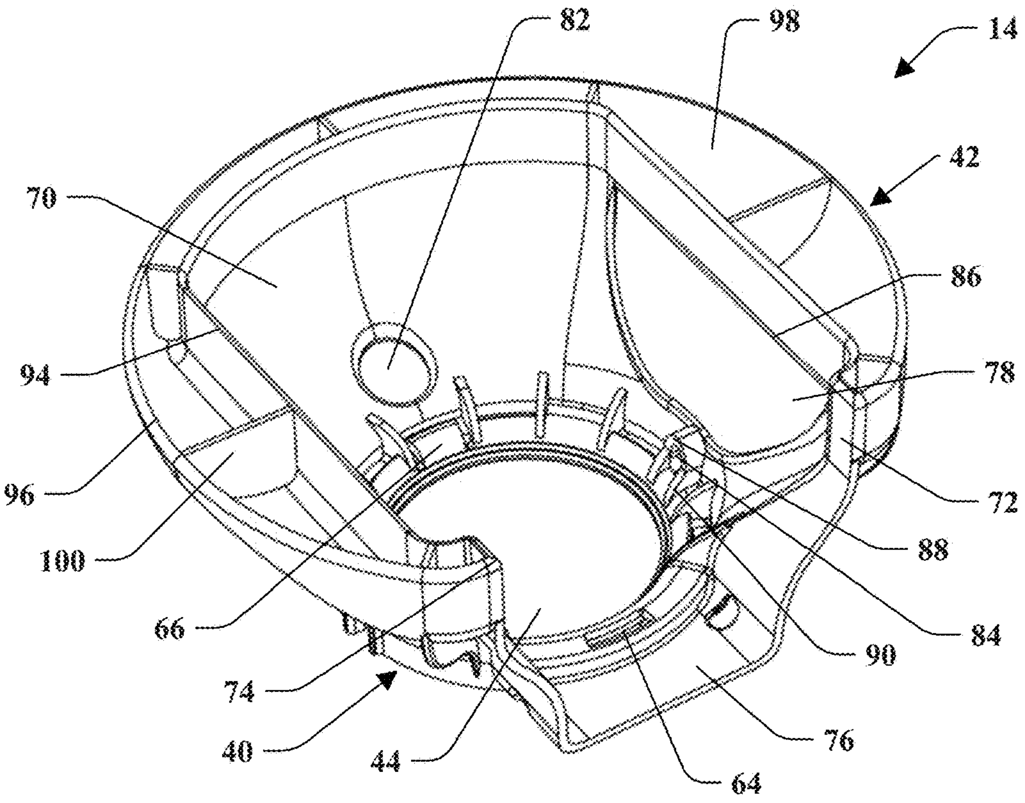
FIG. 5 is a top front perspective view of an exemplary handle.
Figure 6:
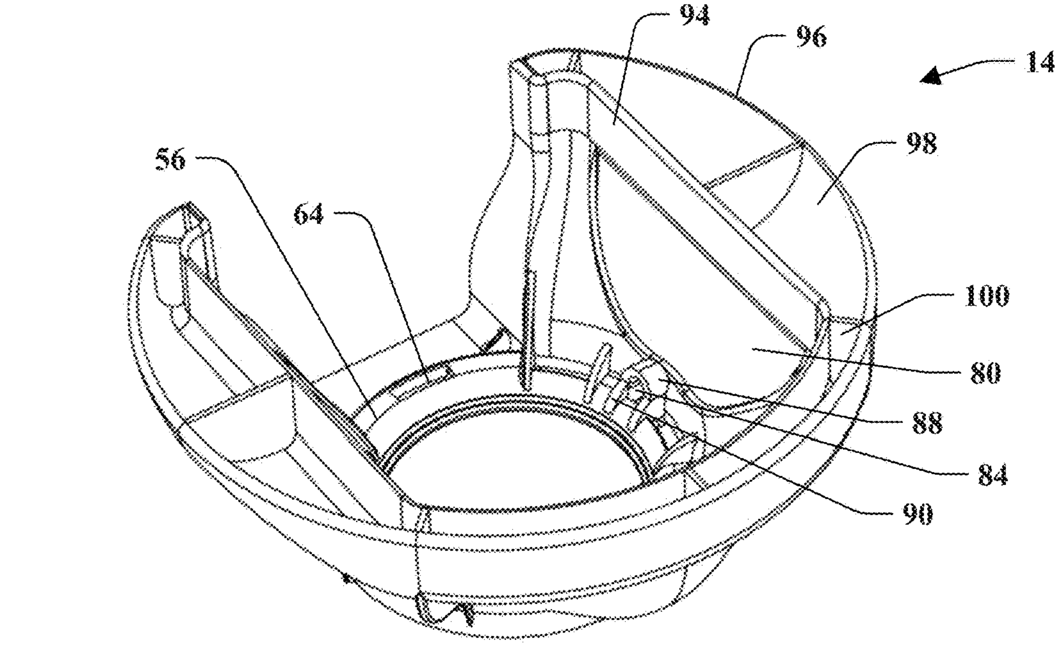
FIG. 6 is a top rear perspective view of the handle.

Embodiments of the invention relate to methods and systems that relate to a portable cylinder. The cylinder has a tank having an upper portion having a valve port, a mounting collar coupled to the upper portion of the tank, and a handle attached to the mounting collar. The mounting collar has an upwardly extending portion surrounding the valve port and a plurality of circumferentially spaced tabs extending radially outwardly from the upwardly extending portion, wherein a respective gap is formed between adjacent ones of the plurality of circumferentially spaced tabs. The handle includes a shroud portion including a plurality of circumferentially spaced ledges for abutting an underside of a respective one of the plurality of circumferentially spaced tabs, and at least one tab for engaging the mounting collar in one of the gaps, and a handle portion extending from the shroud portion and having one or more areas for grasping the handle.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-4, a portable cylinder is shown generally at reference numeral 10. The cylinder 10 includes a tank 12 configured to store a suitable pressurized fluid, a handle 14 attached to a top of the tank 12, and one or more feet 16 at a bottom of the tank 12. In an embodiment, a suitable foot assembly may be attached to the bottom of the tank 12 in place of or in addition to the feet 16.

The handle 14 and/or tank 12 can have a color that is chosen to reflect the different materials of the handle 14 and/or tank 12 and/or the different fluids stored in the tank 12. For example, the tank 12 and/or handle 14 may be a first color to indicate that helium is stored in the tank 12, a second color to indicate that a first type of refrigerant is stored in the tank 12, a third color to indicate that a second type of refrigerant is stored in the tank 12, etc. The tank 12 may be made of a suitable material, such as a suitable metal, such as steel, and in an embodiment the tank may be non-refillable and thus disposable.

The tank 12 includes an upper portion 18 having a valve port 20 for receiving a suitable valve 24, and a mounting collar 22 is provided surrounding the valve port 20. The mounting collar 22 may be secured to the upper portion 18 in any suitable manner, such as by a suitable welding process, such as spot welding, arc welding, etc., or may alternatively be integrally formed with the upper portion 18. In an embodiment, the mounting collar 22 is positioned on the upper portion 18, the valve 24 is positioned in the valve port 20, and then the mounting collar 22 and the valve 24 are secured to the upper portion 18 at the same time in one welding process. In another embodiment, the mounting collar 22 is positioned on the upper portion 18 and secured thereto in a first welding process, and the valve 24 is positioned in the valve port 20 and secured thereto in a second welding process. The mounting collar 22 may be made of a suitable material, such as metal, such as a steel of a grade to allow for welding, corrosion resistance, and to absorb tension on the cylinder without significant deformation.

The mounting collar 22 has a base 26, which is shown as substantially circular, attached to the upper portion 18 and including an opening 28 surrounding the valve port 20, an upwardly extending portion 30 extending around a perimeter of the base 26, and a plurality of circumferentially spaced tabs 32 extending radially outwardly from the upwardly extending portion 30. A respective gap 34 is formed between adjacent ones of the plurality of circumferentially spaced tabs 32. The upwardly extending portion 30 may include an outwardly extending lip 36 at the areas between adjacent tabs 32. In the illustrated embodiment, the mounting collar 22 includes seven circumferentially spaced tabs 32 equally spaced from one another, although it we be appreciated that any suitable number of tabs may be provided.

Referring additionally to FIGS. 5-14, the handle 14 will be discussed in detail. The handle 14 includes a shroud portion 40 that attaches to the mounting collar 22 as will be described below in detail and a handle portion 42 projecting from the shroud portion 40. The handle 14 has the rigidity to maintain ergonomic integrity while having the flexibility to absorb energy, and may be made of a suitable material, such as a polymeric material that is compressible to absorb shocks during drops or impacts.

The shroud portion 40 includes an inner body portion 50 with an opening 52 or through passage extending therethrough to surround the valve portion 20, an outer body portion 54 radially outwardly spaced from the inner body portion 50, and a base 56 extending therebetween. A channel 46 is defined between the inner and outer body portions 50 and 54 and the base 56 for receiving the mounting collar 22 such that a radially outer surface of the inner body portion 50 will abut or be in close proximity to the upwardly extending portion 30 and a radially inner surface of the outer body portion 54 will abut or be in close proximity to an outer edge of the circumferentially spaced tabs 32. The inner and outer body portions 50 and 54 may be circular or substantially circular to correspond to the geometry of the mounting collar 22.

The shroud portion 40 also includes a plurality of circumferentially spaced ledges 58 extending radially inwardly from the outer body portion 54 in the channel 46. In the illustrated embodiment, the shroud portion 40 includes seven ledges 58 equally spaced from one another, one ledge 58 corresponding to each of the plurality of circumferentially spaced tabs 32, although it will be appreciated that any suitable number of ledges 58 with suitable spacing may be provided. The ledges 58 are each spaced from the base 56 in a first direction to define areas for receiving a respective one of the plurality of circumferentially spaced tabs 32 of the mounting collar 22, and each ledge 58 is spaced from the inner body portion 50 in a respective second direction orthogonal the first direction to define an area for receiving the upwardly extending portion 30 of the mounting collar 22. Each ledge 58 can include a planar portion 60 and a plurality of circumferentially spaced ribs 62 below the planar portion 60 for providing support to the planar portion 60 while minimizing weight and material usage. A plurality of circumferentially spaced openings 64 are provided in the base 56 at a location where each opening 64 corresponds to one of the plurality of circumferentially spaced ledges 58. As illustrated, each opening 64 is larger than the respective ledge 58.

The shroud portion 40 also includes at least one deflectable tab 66 extending radially outwardly from the inner body portion 50 in the channel 46. As shown, one deflectable tab 66 is provided between a pair of ledges 58 and corresponding openings 64 at a central portion of the handle 14. The deflectable tab 66 is configured to be deflected by one of the circumferentially spaced tabs 32 of the mounting collar 22 during installation, and includes a catch 68 that abuts the upwardly extending portion 30 within one of the gaps 34 once installed. An opening 48 is provide in the base 56 corresponding to the location of the deflectable tab 66.

Figure 7:
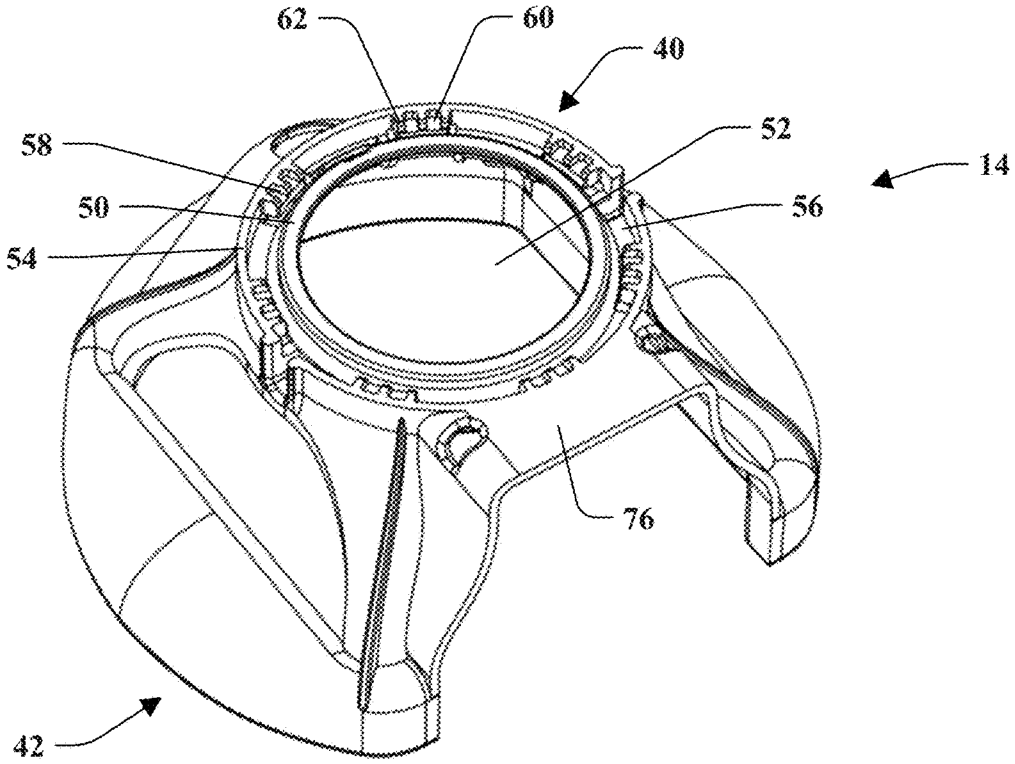
FIG. 7 is a bottom front perspective view of the handle.
Figure 8:
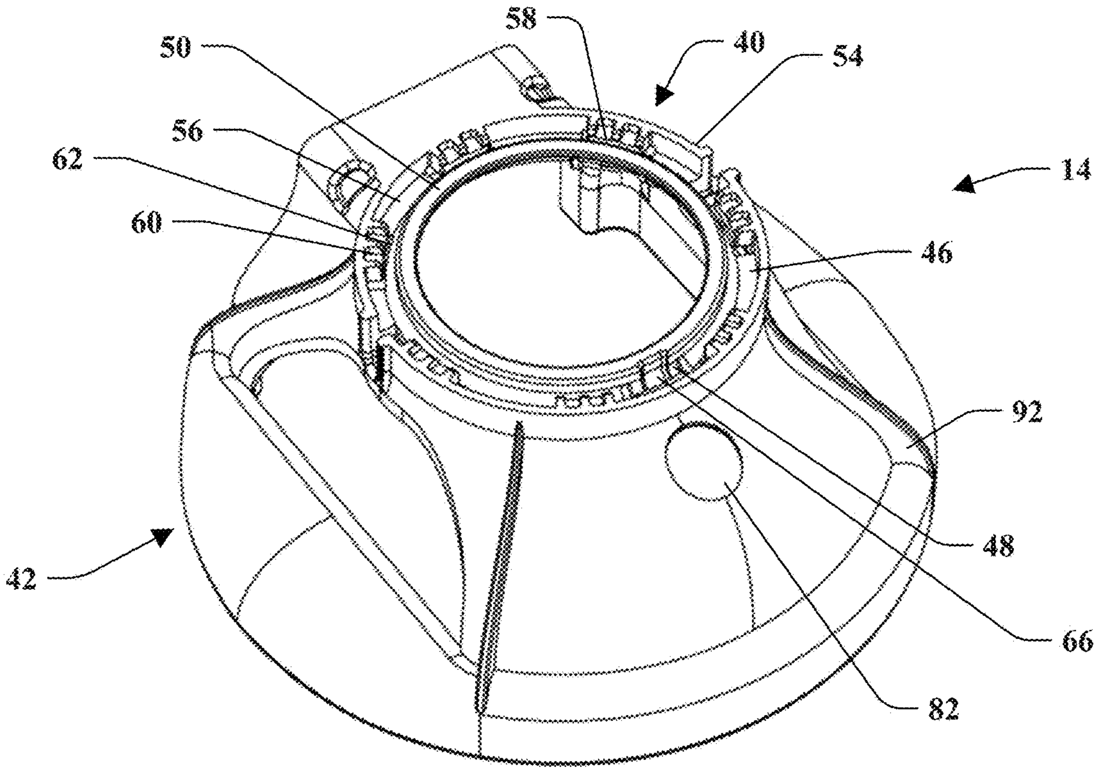
FIG. 8 is a bottom rear perspective view of the handle.
Figure 9:
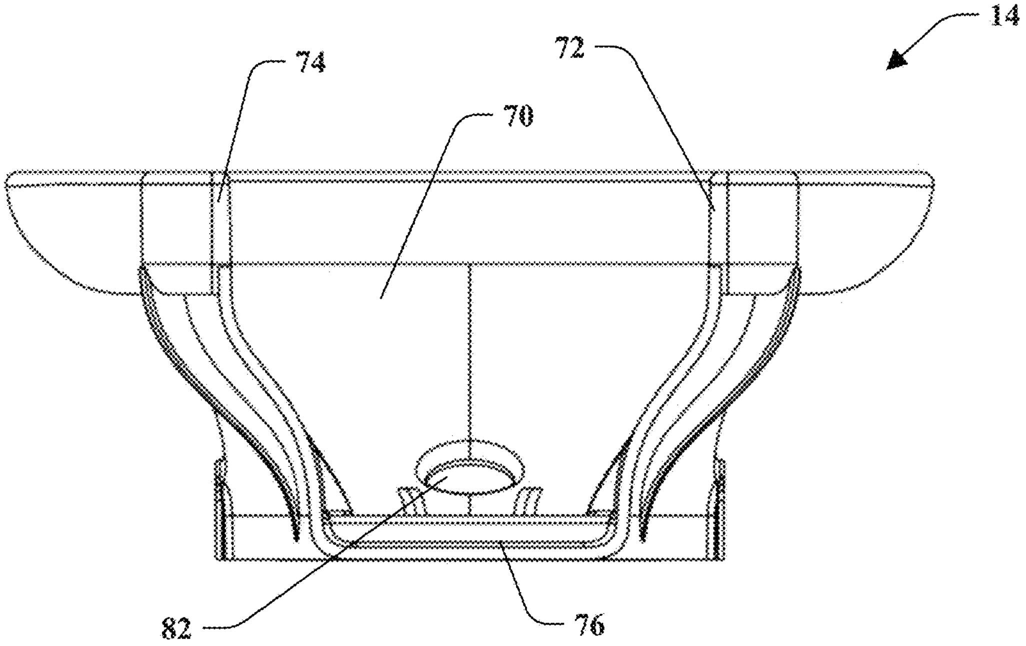
FIG. 9 is a front view of the handle.
Figure 10:
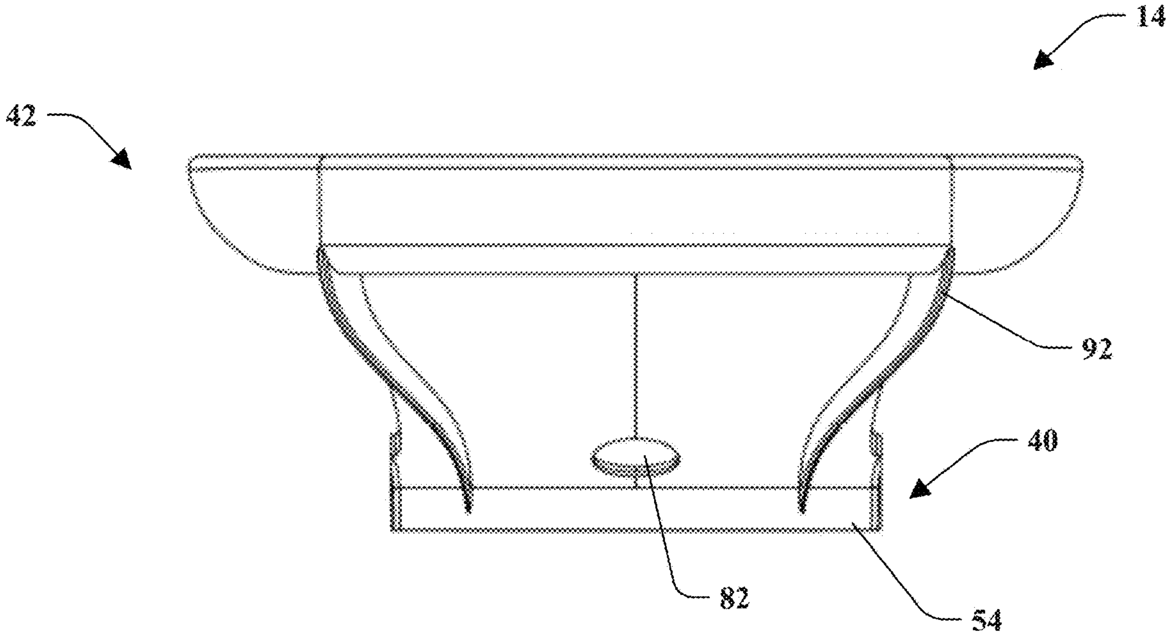
FIG. 10 is a rear view of the handle.
Figure 11:
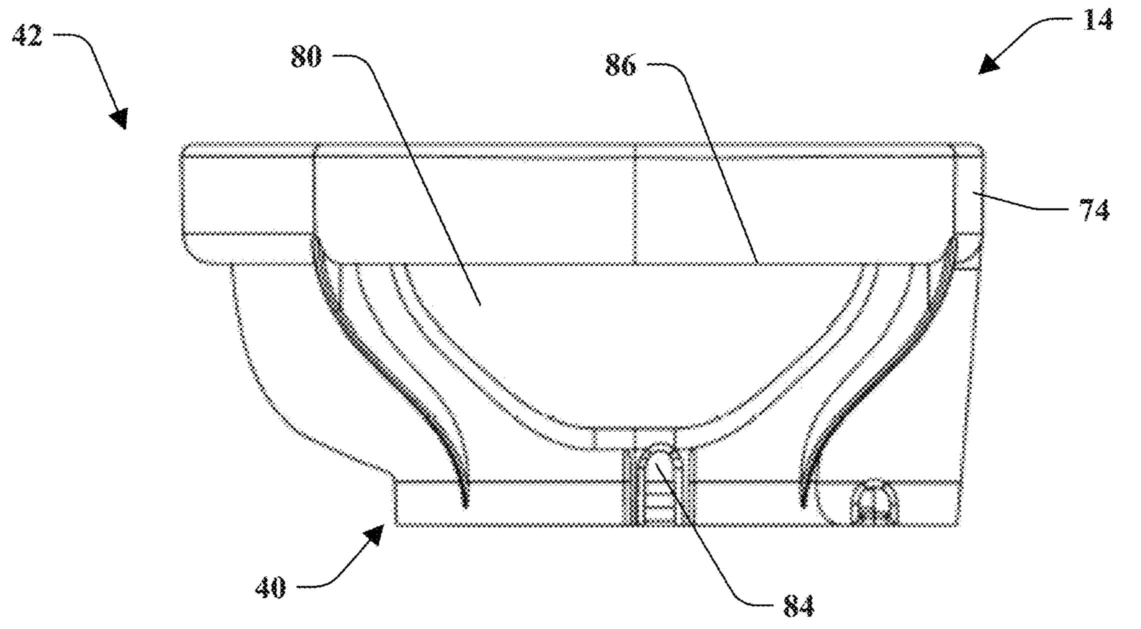
FIG. 11 is a left side view of the handle.
Figure 12:
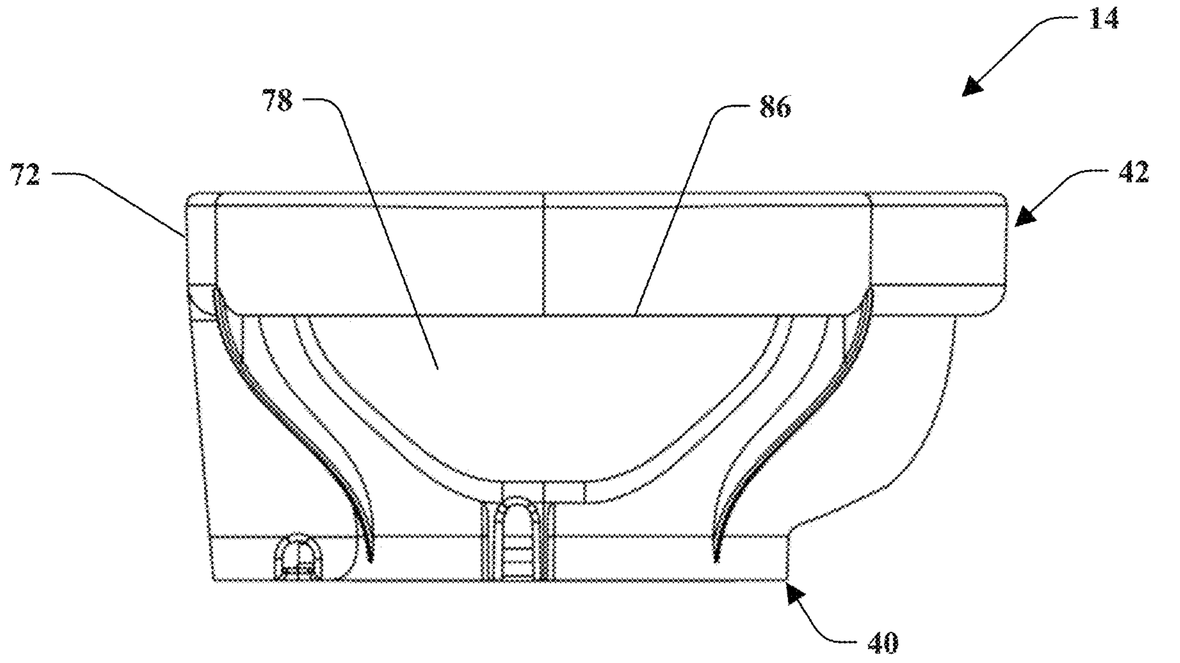
FIG. 12 is a right side view of the handle.
Figure 13:
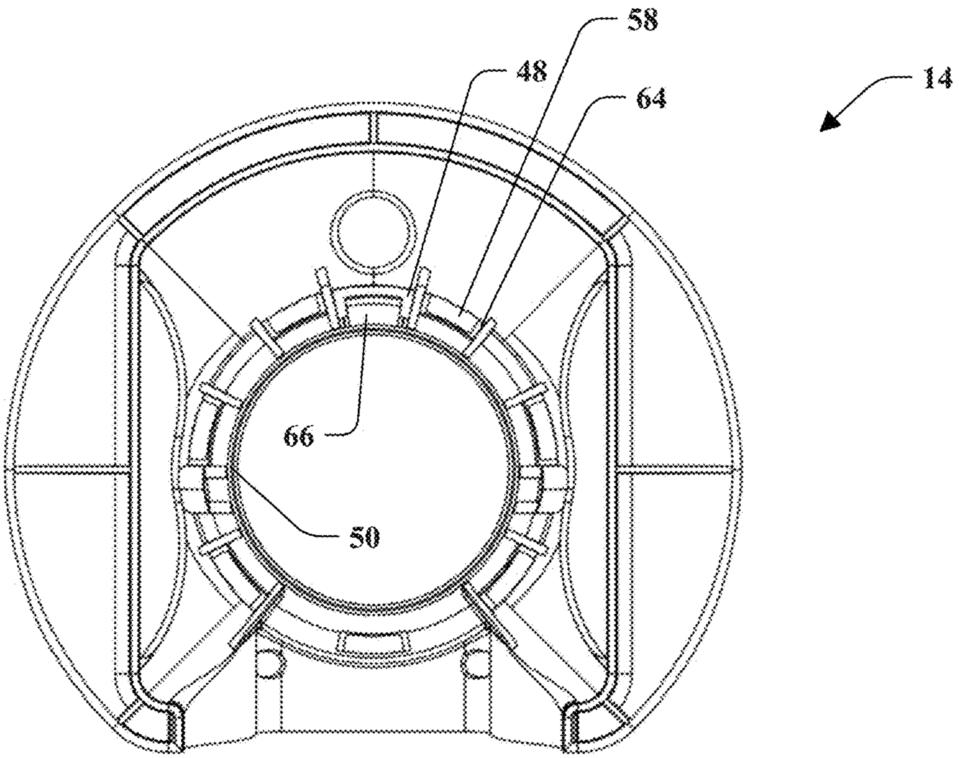
FIG. 13 is a top view of the handle.
Figure 14:
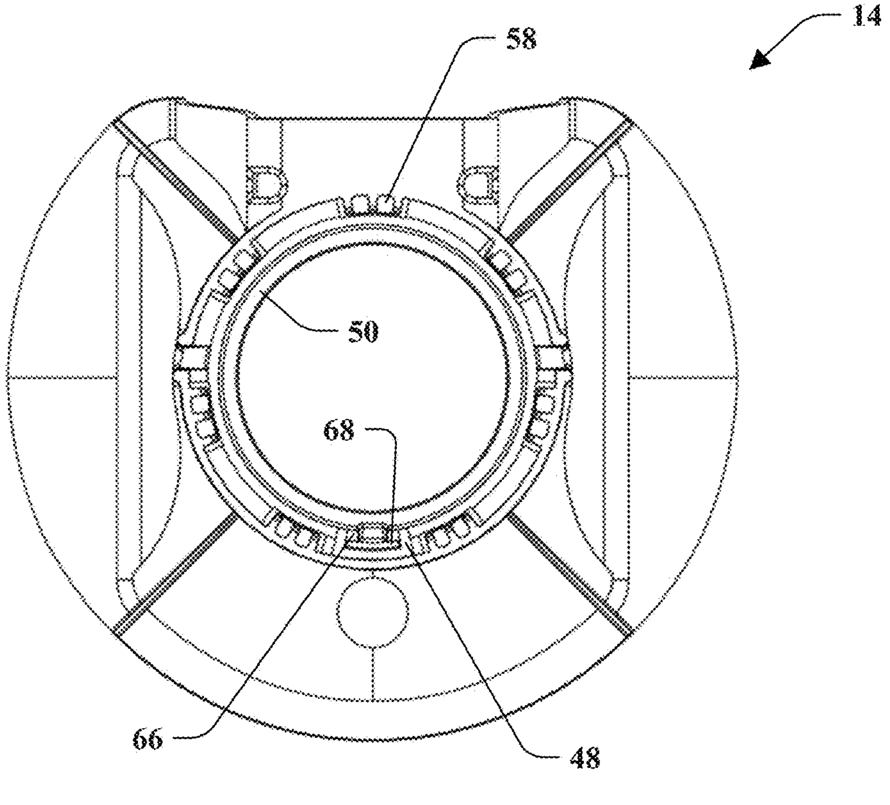
FIG. 14 is a bottom view of the handle.

Referring now to the handle portion 42 in detail, the handle portion 42 has a curved body 70 with first and second ends 72 and 74 circumferentially spaced from one another to define a gap through which a nozzle attached to the valve 24 extends. A support 76 is provided between the first and second ends 72 and 74 that has a substantially planar bottom and curved sides connecting to the first and second ends 72 and 74. A top of the curved body 70 is flat or substantially flat to serve as a foot if the tank 12 is positioned upside down as shown in FIGS. 7 and 8, and to the top of the curved body 70 has a circumference sized to keep the tank 12 stable when the tank is being supported on the curved body 70.

The curved body 70 also includes a plurality of openings 78, 80, and 82 extending therethrough for material and weight savings and one or more openings 84 on a side of the body 70 for receiving a carrying device for transporting cylinders as described below. The body 70 and openings 78 and 80 define grip areas 86 near the top of the handle member 42 for a user or machine to grasp the handle member 42 to transport the cylinder 10. The opening 82 is sized to provide space for tools and/or filling devices that are accessing the valve 24. The one or more openings 84, and as shown an opening 84 at each side of the body 70 are formed through members 88 that are integral with one or more support ribs 90 or can be formed separate therefrom.

The body 70 has inner and outer surfaces 94 and 96 at the top thereof that define a channel 98 for material and weight savings, and one or more support ribs 100 can be provided between the inner and outer surfaces 94 and 96. The inner surface 94 is shown with substantially straight portions to allow existing cartons to be utilized when transporting the handle 14. The handle 14 can also include a plurality of the support ribs 90 extending around an interior between the body 70 and the shroud portion 40 and a plurality of support ribs 92 extending around an exterior of the body 70. The support ribs 90 and 92 can be provided for structural integrity of the handle 14 while minimizing material usage. Any suitable number of support ribs may be provided along the interior and exterior of the body 70.

Turning now to FIGS. 15-22, the attachment of the handle 14 to the tank 12 will be described in detail. FIGS. 16-21 show the handle 14 with portions cutaway and/or portions enlarged to illustrate the attachment of the handle 14 to the tank 12. The handle 14 may be attached to the tank 12 in any suitable manner, for example by a semi-autonomous process or by a fully autonomous process. The handle 14 and tank 12 are designed to be disposable, and as such the handle 14 is attached to the tank 12 in a substantially permanent manner and is removable upon destruction of one of the handle 14 or tank 12.

Figure 15:
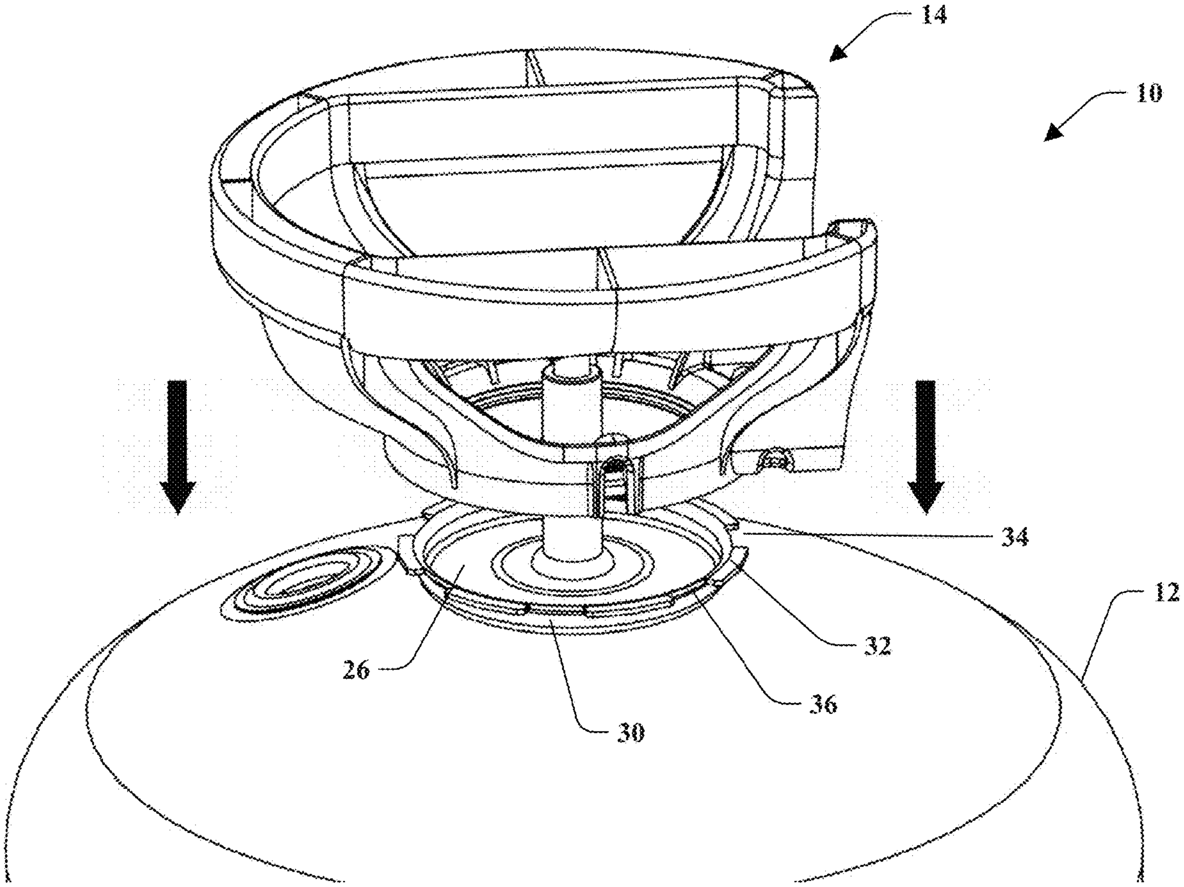
FIG. 15 is a perspective view of the handle being attached to a tank.
Figure 16:
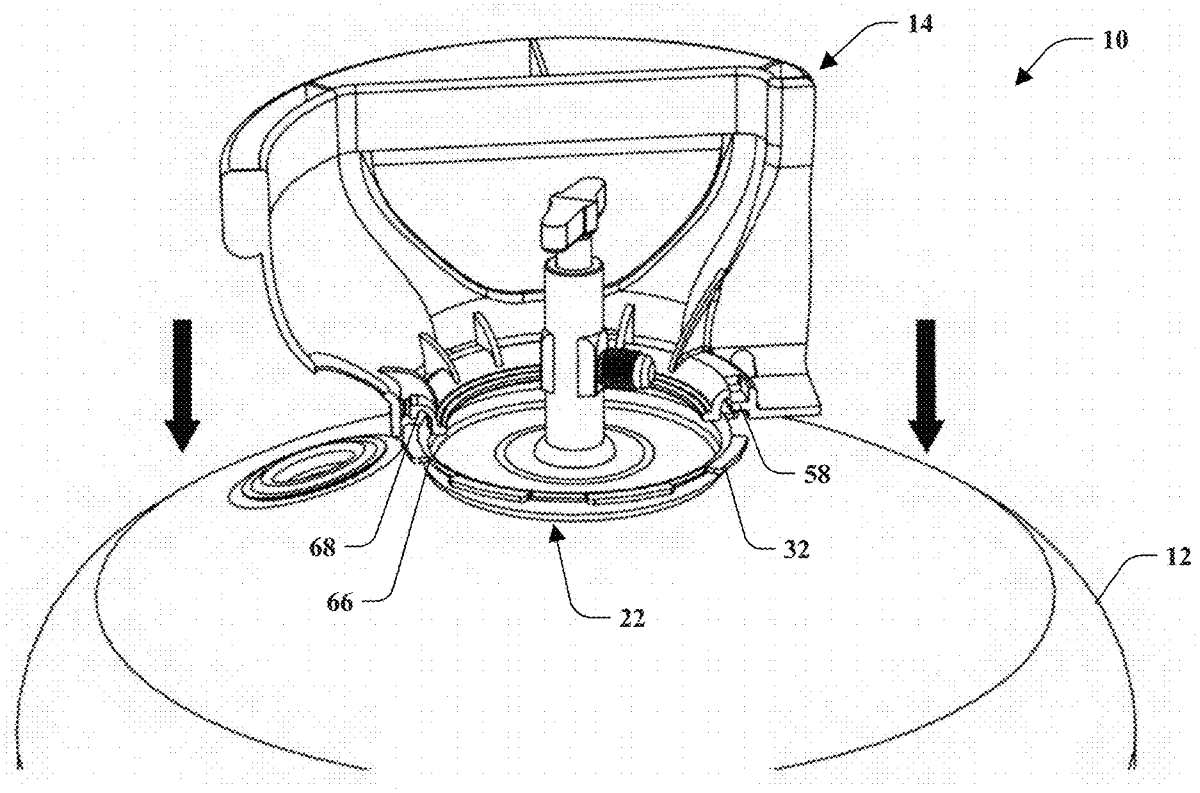
FIG. 16 is another perspective view of the handle being attached to the tank.
Figure 17:
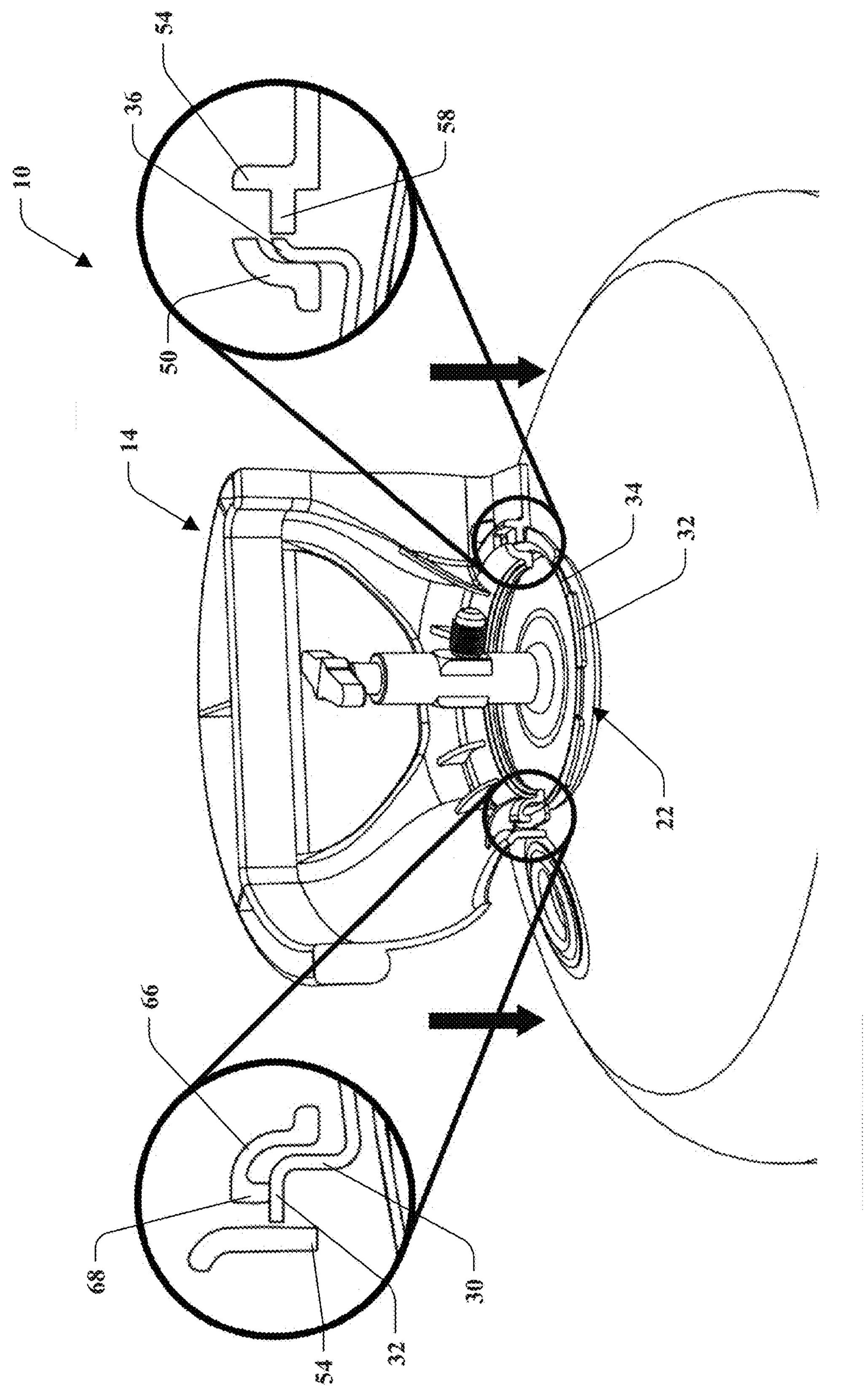
FIG. 17 is still another perspective view of the handle being attached to the tank.

Referring initially to FIGS. 15-17, to attach the shroud portion 40 to the mounting collar 22, the handle 14 is lowered onto the mounting collar in a downward direction. If not already aligned, the handle 14 can be rotated to align the plurality of circumferentially spaced ledges 58 with the respective gaps 34. As the handle 14 is further lowered, at least one deflectable tab 66 contacts a top of one of the plurality of circumferentially spaced tabs 32 and the plurality of circumferentially spaced ledges 58 are received in the gaps 34 as shown in FIG. 17.

Figure 18:
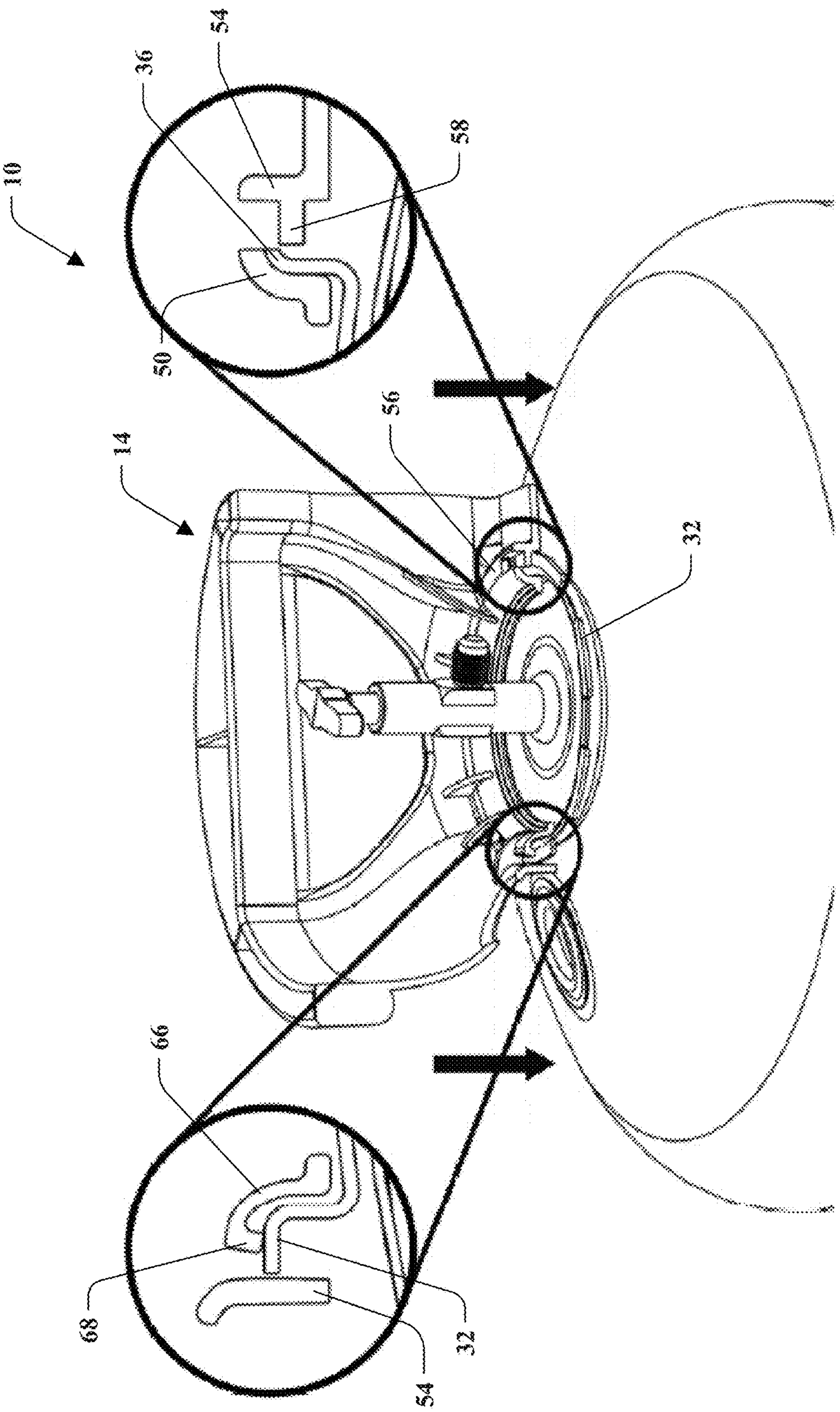
FIG. 18 is yet another perspective view of the handle being attached to the tank.

Referring now to FIG. 18, as the handle 14 is further lowered, the outer surface of the inner body portion 50 and base 56 of the shroud portion 40 contact the top of the upwardly extending portion 30 at the lip 36 preventing further downward movement of the handle 14. In this position, the plurality of circumferentially spaced ledges 58 pass through the respective gaps 34 and move below the plurality of circumferentially spaced tabs 32. At the same time the at least one deflectable tab 66 is deflected upward by the one of the plurality of circumferentially spaced tabs 32 that the deflectable tab 66 contacted.

Figure 19:
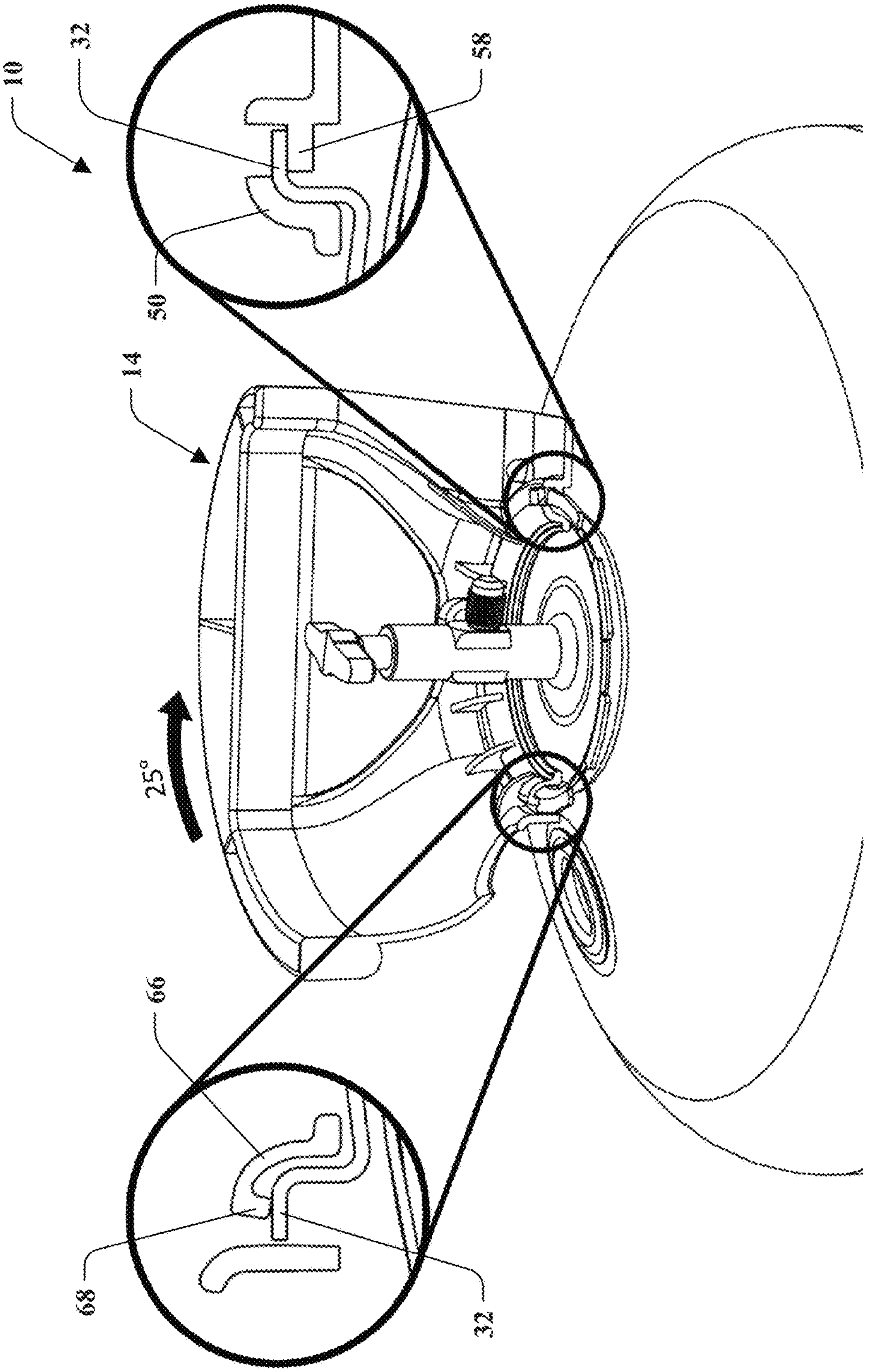
FIG. 19 is a further perspective view of the handle being attached to the tank.
Figure 20:
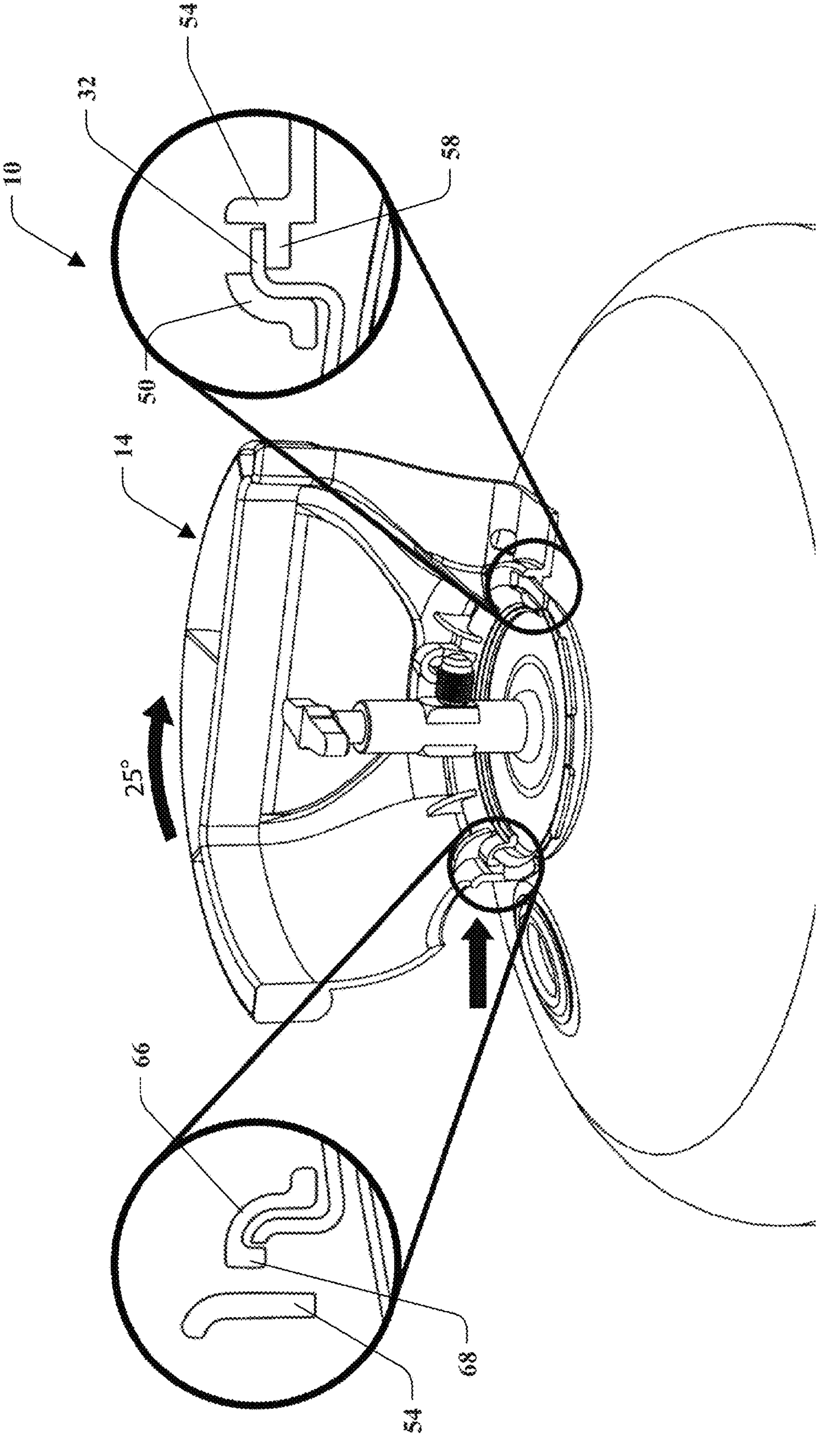
FIG. 20 is another perspective view of the handle being attached to the tank.
Figure 21:
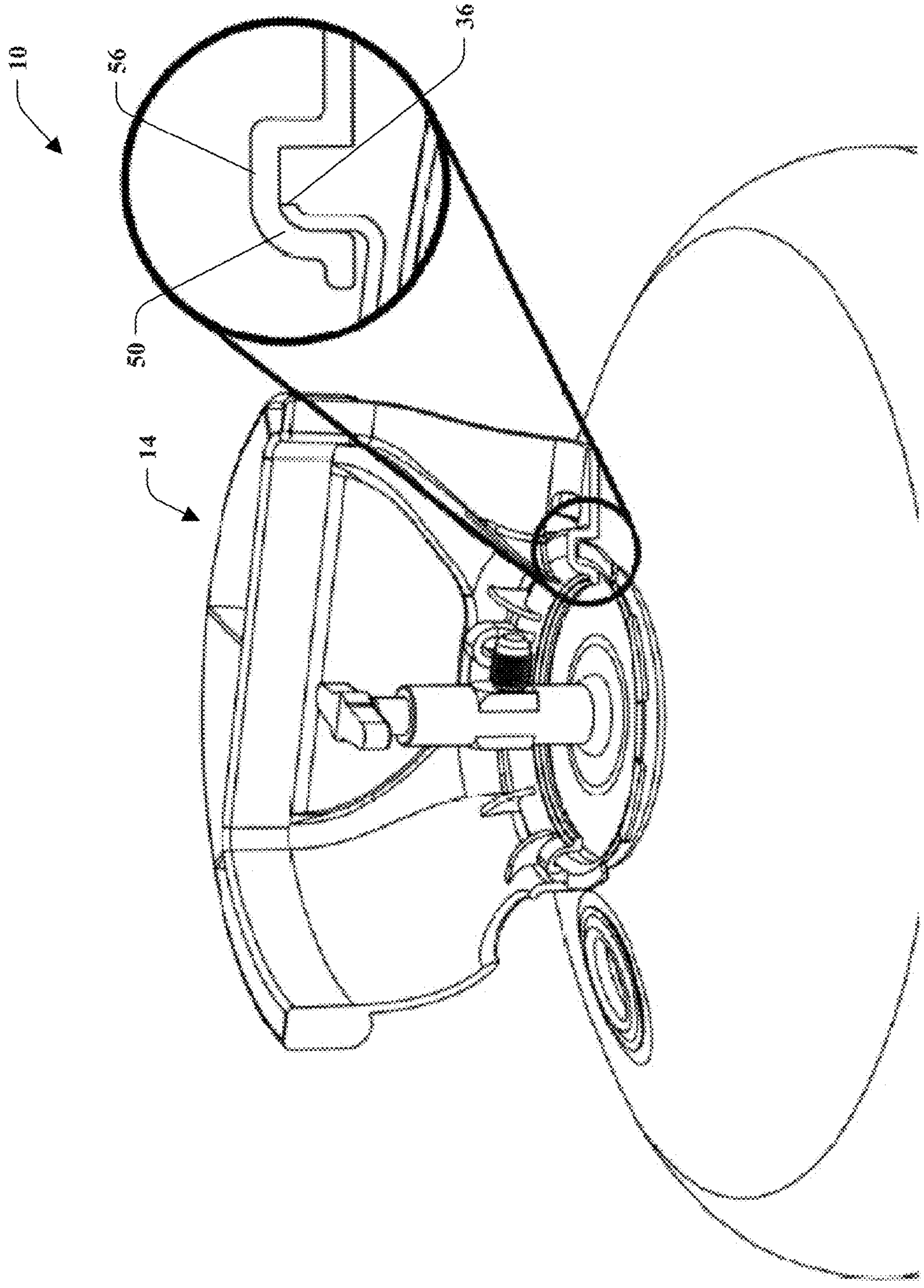
FIG. 21 is still another perspective view of the handle being attached to the tank.
Figure 22:
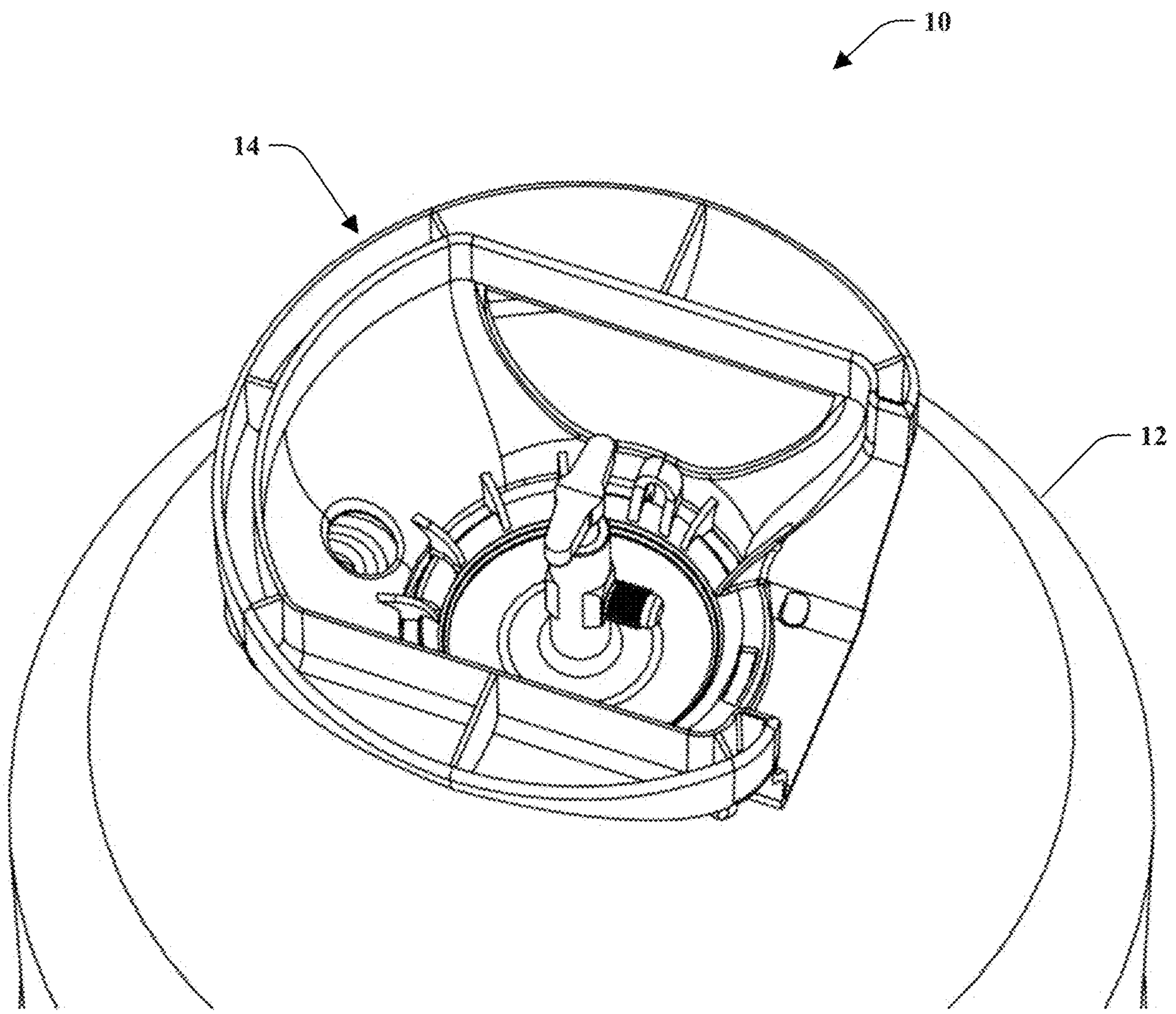
FIG. 22 is a top perspective view of the handle attached to the tank.

Referring now to FIGS. 19-21, the handle 14 is then rotated relative to the tank 12, for example by about twenty-five degrees. As rotation begins in FIG. 19, the at least one deflectable tab 66 moves relative to the one of the plurality of circumferentially spaced tabs 32 and remains in the deflected position while the plurality of circumferentially spaced ledges 58 move under a respective one of the plurality of circumferentially spaced tabs 32. The handle 14 is rotated until the at least one deflectable tab 66 has moved past the end of the one of the plurality of circumferentially spaced tabs 32 into the adjacent one of the gaps 34 and returns to its unbiased position as shown in FIGS. 20 and 21. In its unbiased position the catch 68 abuts or is in close proximity to the upwardly extending portion 30 of the mounting collar 22. In this position each of the plurality of circumferentially spaced ledges 58 is positioned beneath a respective one of the plurality of circumferentially spaced tabs 32, with the plurality of circumferentially spaced tabs 32 being visible through the plurality of openings 64 as shown in FIG. 21. FIG. 21 also illustrates the interaction between the handle 14 and the mounting collar 22 at one of the areas without one of the circumferentially spaced ledges 58, and FIG. 22 illustrates the assembled cylinder.

The interaction between the circumferentially spaced ledges 58 and the plurality of circumferentially spaced tabs 32 prevents upward movement of the handle 14 relative to the mounting collar 22, and the interaction between the base 56 of the shroud portion 40 and the upwardly extending portion 30 prevents further downward movement of the handle 14 relative to the mounting collar. The positioning of the at least one deflectable tab 66 in one of the gaps 34 between a pair of the plurality of circumferentially spaced tabs 32 prevents or substantially prevents rotation of the handle 14 relative to the mounting collar 22.

Figure 23:
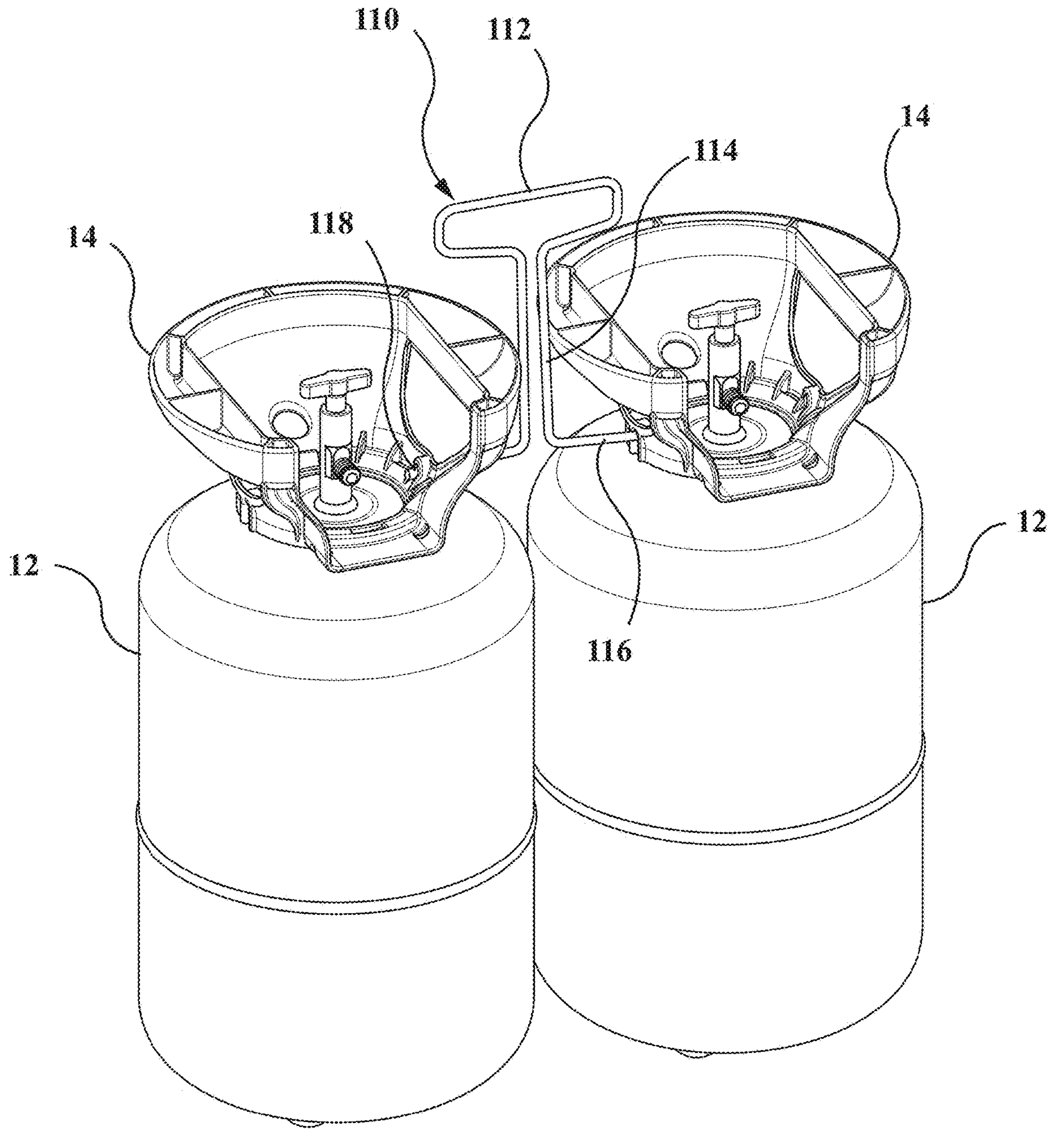
FIG. 23 is a perspective view of two cylinders attached to a carrying device.

Turning now to FIG. 23, a pair of cylinders 10 are illustrated, each cylinder having a tank 12, a handle 14 attached to the tank, feet 16, and a valve 24 attached to a valve port. Also provided is a carrying handle 110 coupled to each cylinder 10. The carrying handle 110 may be made of a suitable material, such a metal, and may be formed by bending or otherwise altering a straight piece of metal. The carrying handle 110 include a grip portion 112 for a user or machine to grasp when transporting the cylinders 10, a pair of extension 114 extending downward from the grip portion 112, an attachment portion 116 extending outwardly from each of the extensions 114 substantially parallel thereto, and an upwardly angled portion 118 at the end of each attachment portion 116 to prevent the cylinders 10 from falling off the carrying handle 110 during transport. The extensions 114 space the attachment portions 116 from the grip portion 112 so the grip portion 112 can be grasped above the handles 14.

To transport the cylinders 10, each upwardly angled portion 118 and attachment portion 116 is received in one of the openings 84 in the handle 14 and advanced towards the respective valve 24 until the upwardly angled portion 118 passes through the respective opening 84 into an inner area of the respective handle 14. The grip portion 112 is then positioned above the handles 14 so the user can grasp the grip portion 112.

The aforementioned systems, components, (e.g., cylinders, tanks, handles, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A one-piece handle for a cylinder comprising:

a shroud portion configured to attach to a collar of the cylinder, the shroud portion including an inner body portion, an outer body portion radially outwardly spaced from the inner body portion, a base extending therebetween, a plurality of circumferentially spaced ledges extending radially inwardly from the outer body portion for abutting an underside of a respective one of a plurality of circumferentially spaced tabs of the collar, and at least one deflectable tab extending upward toward the base and radially outwardly from the inner body portion for engaging the collar to prevent the plurality of circumferentially spaced ledges from being rotated out of an attachment position; and a handle portion extending upward from the shroud portion and having one or more areas for grasping the handle.

2. The handle according to claim 1, wherein the plurality of circumferentially spaced ledges are sized to be received between circumferentially spaced tabs on the collar during a first installation step, and configured to be rotated to be positioned below the circumferentially spaced tabs in a second installation step.

3. The handle according to claim 1, wherein the plurality of circumferentially spaced ledges each include a planar portion and a plurality of circumferentially spaced ribs below the respective planar portion.

4. The handle according to claim 1, wherein each ledge is spaced from the base in a first direction to define an area for receiving a respective one of the plurality of circumferentially spaced tabs, and each ledge is spaced from the inner body portion in a respective second direction orthogonal the first direction to define an area for receiving an upwardly extending portion of the collar.

5. The handle according to claim 1, wherein the base includes a plurality of circumferentially spaced openings above each of the plurality of circumferentially spaced ledges.

6. The handle according to claim 1, wherein the handle portion has a body with first and second ends circumferentially spaced from one another to define a gap through which a nozzle extends.

7. The handle according to claim 6, wherein the body includes at least two openings that define grip areas with the body.

8. The handle according to claim 7, further comprising at least one opening above the base and below the at least two openings defining the grip areas for receiving a carrying device for transporting the cylinder.

9. The handle according to claim 1, wherein the shroud portion defines a bottom portion of the handle such that bottoms of the inner and outer body portions are proximate the cylinder and the handle portion defines a top portion of the handle extending above the shroud portion.

10. A portable cylinder comprising:

a tank having an upper portion having a valve port;

a mounting collar coupled to the upper portion of the tank, the mounting collar having an upwardly extending portion surrounding the valve port and a plurality of circumferentially spaced tabs extending radially outwardly from the upwardly extending portion, wherein a respective gap is formed between adjacent ones of the plurality of circumferentially spaced tabs; and a one-piece handle attached to the mounting collar, the handle comprising:

a shroud portion including a plurality of circumferentially spaced ledges for abutting an underside of a respective one of the plurality of circumferentially spaced tabs in an attachment position, and at least one deflectable tab between adjacent ones of the plurality of circumferentially spaced ledges in a circumferential direction, the at least one deflectable tab having a downwardly extending catch for engaging the upwardly extending portion of the mounting collar in one of the gaps to prevent the plurality of circumferentially spaced ledges from being rotated out of the attachment position; and a handle portion extending from the shroud portion and having one or more areas for grasping the handle.

11. The portable cylinder according to claim 10, wherein the shroud portion includes an inner body portion, an outer body portion radially outwardly spaced from the inner body portion, and a base extending therebetween, and wherein a channel is defined between the inner and outer body portions and the base for receiving the collar.

12. The portable cylinder according to claim 11, wherein the plurality of circumferentially spaced ledges extend radially inwardly from the outer body portion, and the at least one deflectable tab extends radially outwardly from the inner body portion.

13. The portable cylinder according to claim 11, where each ledge is spaced from the base in a first direction to define an area for receiving a respective one of the plurality of circumferentially spaced tabs, and each ledge is spaced from the inner body portion in a respective second direction orthogonal the first direction to define an area for receiving the upwardly extending portion of the collar.

14. The portable cylinder according to claim 10, wherein the plurality of circumferentially spaced ledges are sized to be received in a respective one of the gaps and the at least one deflectable tab is deflected by one of the plurality of circumferentially spaced tabs during a first installation step, and the plurality of circumferentially spaced ledges are configured to be rotated to the attachment position below the tabs in a second installation step.

15. The portable cylinder according to claim 10, wherein the mounting collar includes a base coupled to the upper portion of the tank, and wherein the upwardly extending portion extends around a perimeter of the base.

16. The portable cylinder according to claim 10, wherein the handle portion has a body with first and second ends circumferentially spaced from one another to define a gap in a circumferential direction through which a nozzle extends.

17. A one-piece handle for a cylinder configured to store pressurized fluid, the one-piece handle comprising:

a shroud portion configured to attach to a collar of the cylinder, the shroud portion including an inner body portion, an outer body portion, a base extending therebetween, a plurality of circumferentially spaced ledges for abutting an underside of a respective one of a plurality of circumferentially spaced tabs of the collar, and at least one deflectable tab extending radially outwardly from the inner body portion between adjacent ones of the plurality of circumferentially spaced ledges in a circumferential direction for engaging the collar; and a handle portion extending from the shroud portion and having one or more areas for grasping the handle.

18. The handle according to claim 17, wherein the plurality of circumferentially spaced ledges each include a planar portion and a plurality of circumferentially spaced ribs below the respective planar portion.

19. The handle according to claim 17, wherein the handle portion has a body with first and second ends circumferentially spaced from one another to define a gap through which a nozzle extends.

20. The handle according to claim 17, wherein the shroud portion defines a bottom portion of the handle such that bottoms of the inner and outer body portions are proximate the cylinder and the handle portion defines a top portion of the handle extending above the shroud portion.

* * * * *